C. SCHMIDT.
STEERING AND MOTOR CONTROLLING MECHANISM FOR AUTOMOBILES.
APPLICATION FILED JAN. 15, 1906. RENEWED JUNE 10, 1907.
946,465.
Patented Jan. 11, 1910.
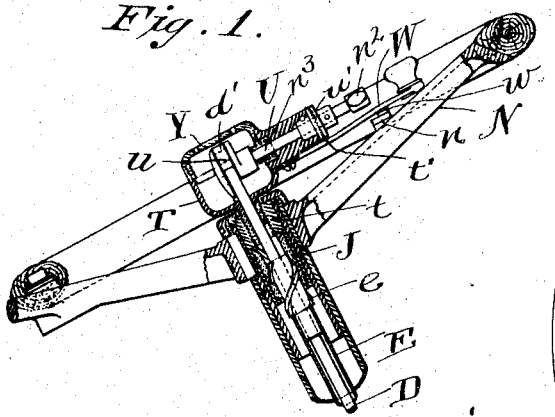
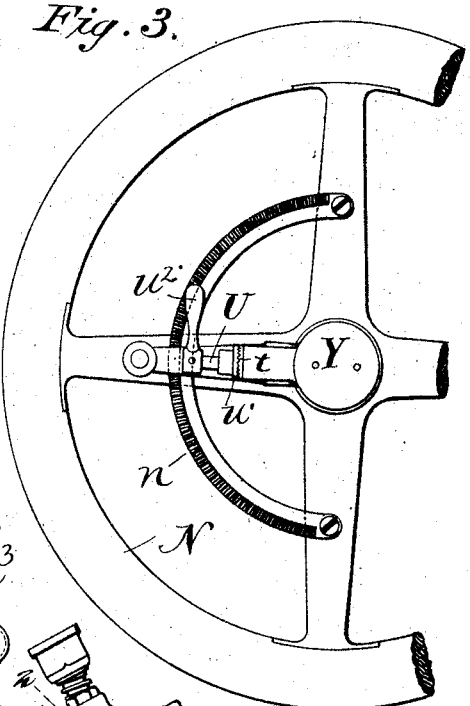
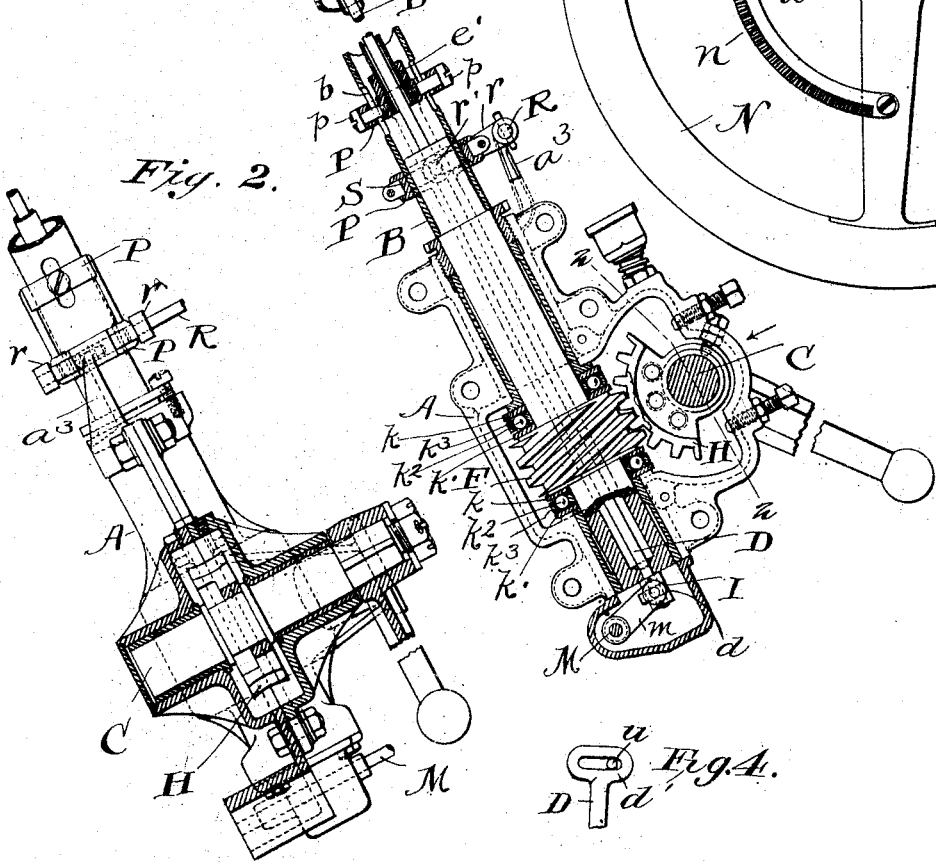
WITNESSES:
H. R. Sullivan
E. B. Filchner
INVENTOR:
Charles Schmidt
by his attorneys
Thurston Bates & Woodward

UNITED STATES PATENT OFFICE.

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

STEERING AND MOTOR-CONTROLLING MECHANISM FOR AUTOMOBILES.

946,465.      Specification of Letters Patent.      Patented Jan. 11, 1910.

Application filed January 15, 1906, Serial No. 296,105. Renewed June 10, 1907. Serial No. 378,287.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Steering and Motor-Controlling Mechanism for Automobiles, of which the following is a full, clear, and exact description, reference being had to the accompanying drawings.

This invention relates to the mechanism for controlling an explosive engine on an automobile, and to the convenient combination of such mechanism with the steering mechanism, whereby the driver will have all of said mechanisms conveniently arranged for his use.

The object of the invention is to simplify such mechanism, and particularly to produce such a construction that the relation between the mechanisms for respectively operating the throttle and the spark controlling mechanism shall remain unchanged, however much either may be operated independently.

The invention consists of the combination of parts hereinafter described, and pointed out in the claims.

In the drawing, Figure 1 is a side elevation, mostly in central section, of the mechanism in which the present invention is embodied. Fig. 2 is a side view of the lower part of said mechanism which is sectioned in the plane indicated by line 2—2, looking in the direction of the arrow associated with Fig. 1. Fig. 3 is a plan view of a part of the steering wheel and the mechanism adjacent thereto. Fig. 4 is a view of the upper end of the rod D and the crank by which it is operated.

Referring to the parts by letters, A represents a casing which is to be firmly secured to the frame of the motor car. This casing furnishes a bearing for the lower end of the tubular steering column B, and for the steering shaft C. A worm F is formed upon the steering column, and the gear H is attached to said shaft C, whereby motion is transmitted from the steering column to said shaft,—all of which is familiar construction.

Within the casing are two antifriction thrust bearings located respectively above and below the worm F, each of said bearings consisting of two hardened steel plates $k$ $k'$, the interposed balls $k^2$, and a ball retainer $k^3$. The steering wheel N is rigidly secured to the upper end of the tubular column B.

Within the steering column is a throttle controlling tube E having an external quick screw thread $e$ at its upper end, which thread engages with the internal threads of a tubular shaft or sleeve nut J which is rotatably mounted in the upper end of the steering column.

The spark controlling operating rod or staff D extends longitudinally through the tube E and said sleeve nut, projecting from the upper end of the latter. It also extends downward the whole length of the steering column and projects from the lower end thereof into a part of the casing A. In this projecting lower end is a circumferential groove $d$. In the groove thereof, a ring I is loosely fitted,—the diameter of the hole in this ring being of such size as to permit considerable transverse movement thereof, relative to said rod.

M represents a rock shaft which is journaled in the casing and projects out of the same so that motion transmitting mechanism may be connected with said projecting end. A fork arm $m$, fast to said rock shaft within the casing is pivotally connected with said ring, whereby endwise movement of rod D, will rock said rock shaft. The function of this rock shaft is to adjust the sparking mechanism for the purpose of advancing or retarding the production of the igniting spark. The sparking mechanism is no part of the present invention and any sparking mechanism adapted to be adjusted by said rock shaft may be employed.

To the lower end of the tube E,—which is above the upper end of casing A,—a collar or other form of enlargement $e'$ is rigidly secured. A sliding sleeve P loosely embraces the steering column and is connected with this enlargement $e'$ by means of screws $p$ which are diametrically opposed and which pass through this sleeve and through longitudinal slots $b$ in the steering column and screw into said enlargement. This construction prevents rotation of the tube E, and also furnishes the connection between it and sleeve P. In the lower part of this sleeve P is an annular groove which receives a loose fitting collar S. In a bracket arm $a^3$, attached to the casing A, a rock shaft R is mounted; and to this rock shaft fork arms $r$ are secured, which extend outside of this collar S,—said arms being pivotally connected thereto by diametrically opposed pins $r'$. The longitudinal movement of the collar P will, through the described mechanism, rock the rock shaft R, which is to be connected by any suitable mechanism with the throttling mechanism of the engine.

The tubular threaded stem of a crank casing T is screwed into the upper end of the rotatable nut J and is then secured to said nut, by means of a pin $t$. This crank casing furnishes the bearings for a small rock shaft U which is provided, within the crank casing with a crank pin $u$ which enters a transverse slot in the head $d'$ on the upper end of the rod D,—which rod projects into said casing through the hollow stem thereof. This rock shaft is movable endwise in its bearings a short distance, although not enough to withdraw the crank pin from said slot. Outside of the crank casing a serrated disk $u'$ is secured to this shaft, which is adapted to engage with correspondingly serrated surfaces $t'$ on the crank casing. An operating handle $u^2$ is secured to the outer end of this shaft. This rock shaft and its handle constitutes a hand grip by means of which the rod may be moved endwise. By turning this handle the shaft is turned and the rod D moved up or down, as required to advance or retard the spark. A spring $u^3$ within the casing acts with said shaft toward the rod, and thereby acts to hold said serrated surfaces in engagement to prevent accidental turning of said shaft. This spring yields however, and permits the shaft to move endwise when sufficient force is applied at the operating handle to turn it. The throttle lever W is rigidly fastened to this crank casing. The lever is preferably made of spring metal, having a tooth $w$ on its under side, which is adapted to engage with the upper face of a ratchet segment $n$ secured to the handle wheel N. By swinging this lever along this ratchet segment, the crank casing and the sleeve nut to which it is attached will be turned in one direction or another, relative to the column B thereby causing a corresponding endwise movement of the tube E, which results, as stated, in the rocking of the rock shaft R which controls the throttle mechanism. The turning of the throttle lever, turns, as before stated, the crank casing which has no other effect on the rod D and the parts save to turn said rod. The operating handles $u^2$ and W remain therefore always in the same relation to each other. The turning of the steering wheel of course has no effect upon either the tube E or rod D except to cause them to turn in unison with the wheel. This, however, does not cause them or either of them to move endwise relatively to the steering post B, and therefore does not cause any movement of the parts they are provided to operate.

A cap Y is screwed onto the top of the steering column just above the sleeve nut therein, and this cap prevents upward endwise movement of said nut. The enlargement of the casing just outside the cap prevents endwise downward movement of said nut.

Having thus described my invention, I claim:

1. The combination of a rotatable hollow steering column, a rotatable member mounted upon and projecting into the upper end of said column and having a threaded portion within said column, means preventing the endwise movement of said member, a tube E longitudinally movable in the steering column and having a threaded portion with which the threaded part of said member engages, a reciprocatory rod D passing axially through said member and through said tube E, means mounted upon said member for moving said rod endwise, a handle secured to said member for turning it, and mechanisms respectively operated by the endwise movement of the tube E and rod D.

2. The combination of a hollow rotary steering column, a sleeve nut rotatably mounted in its upper end, and a crank casing fixed to said sleeve nut and a tube E longitudinally movable in said steering column and having external screw threads which are engaged by said sleeve nut, with a reciprocatory rod D passing through the stem of said crank casing and through said sleeve nut and through the tube E and through and out of the lower end of said steering column, mechanism mounted in said crank casing for moving said rod lengthwise, an operating handle secured to said crank casing for turning it and said sleeve nut, and mechanisms respectively operated by the endwise movements of the tube E and rod D.

3. The combination with a hollow rotary steering column, of a sleeve nut rotatably mounted therein, and a piece rigidly secured thereto and extending beyond the upper end of said steering column, a handle secured to said piece whereby it and the sleeve nut may be turned, and a rock shaft mounted in said piece, a longitudinally movable tube within the steering column having external threads near its upper end which are engaged by said sleeve nut, means preventing the rotation of said tube, a reciprocatory rod passing through said sleeve nut and tube and steering column, mechanism for transmitting motion from said rock shaft to said rod, and independent mechanisms operated by the longitudinal movement of said tube and rod.

4. The combination of a rotatable hollow steering column, a tube placed axially therein and having external screw threads near its upper end, a nut rotatably mounted in the upper end of the steering column, a cap screwed onto the steering column for holding said nut in, a crank casing having a stem which extends through said cap and into said sleeve nut to which it is made fast, a longitudinally movable rod passing through said stem, and through the sleeve nut, and through the inclosed tube, and through the steering column, a crank shaft mounted in said crank casing and having a crank within said crank casing, said rod having a transverse slot in its upper end within said crank casing for the reception of the crank pin, and an arm secured to said crank casing for turning it and the sleeve nut, and independent mechanisms operated severally by the said longitudinally movable tube and rod.

5. In a controlling mechanism for automobiles, the combination of a steering post, a shaft to control the throttle valve of the carbureter, a vertically reciprocatory staff to actuate the spark controlling device, mechanism to actuate said shaft, means carried upon said mechanism to actuate said staff, whereby said shaft and said staff may be actuated simultaneously or each independently the one of the other at the will of the operator.

6. In a controlling mechanism for automobiles the combination of a steering post and its rim, a shaft to control the throttle valve of the carbureter, a staff to actuate the spark controlling device, an oscillatory lever arm to actuate said shaft, and a rotatable hand grip carried on said lever to actuate said staff.

7. In a controlling mechanism for automobiles the combination of a steering post and its rim, a shaft to control the throttle valve of the carbureter, a staff to actuate the spark controlling device, an oscillatory lever arm to actuate said shaft, a hand grip rotatable upon its axis carried by said lever arm to actuate said staff, said lever and hand grip movable simultaneously, and said hand grip rotatable independently of the movement of the lever at the will of the operator.

8. In a controlling mechanism for automobiles the combination of a steering post and its rim, a device to control the throttle valve of the carbureter, a device to actuate the spark controlling device, an oscillatory lever to actuate one of said controlling devices, and a hand grip carried upon said lever to actuate the other of said controlling devices.

In testimony whereof, I hereunto affix my signature in the presence of two witnesses.

CHARLES SCHMIDT.

Witnesses:
E. B. GILCHRIST,
E. L. THURSTON.